United States Patent

[11] 3,623,682

[72] Inventor Marcel Kretz
  Paris, France
[21] Appl. No. 860,380
[22] Filed Sept. 23, 1969
[45] Patented Nov. 30, 1971
[73] Assignee Giraviens Dorand
  Suresnes, France
[32] Priority Sept. 27, 1968
[33] France
[31] 167938

[54] ROTARY WING AIRCRAFT
  8 Claims, 5 Drawing Figs.
[52] U.S. Cl. .................................................. 244/17.13,
  416/42, 416/98
[51] Int. Cl. ........................................................ B64c 11/34
[50] Field of Search .......................................... 244/17.11,
  17.13, 17.15, 17.17, 17.25; 416/2, 31, 42, 98, 108,
  156

[56] References Cited
  UNITED STATES PATENTS
3,098,445   7/1963   Jackson ...................... 244/17.15 X
3,210,025  10/1965   Lubben et al. ................. 244/17.17 X
3,428,271   2/1969   Hollrock et al. ............... 244/17.13
3,485,466  12/1969   Prewitt ........................ 244/17.13 X
  FOREIGN PATENTS
215,634    6/1958   Australia ..................... 244/17.13
921,971    1/1947   France ........................ 244/17.13

Primary Examiner—Milton Buchler
Assistant Examiner—Paul E. Sauberer
Attorneys—Robert E. Burns and Emmanuel J. Lobato ABSTRACT: The described invention is of a rotary wing aircraft having an automatically controlled pulloff and landing capability, in which the craft is suspended from the rotor through a stationary shaft and a universal joint, and in which, upon the shaft, are arranged the rotor hub, a mechanical programming mechanism operable by rotation of the rotor relative to the shaft, a blade pitch-control mechanism of which the operation is controlled by the programming mechanism, and a ground-proximity probe arranged to initiate operation of the program on contact with the ground, all so as to render automatic the pulloff and landing controls.

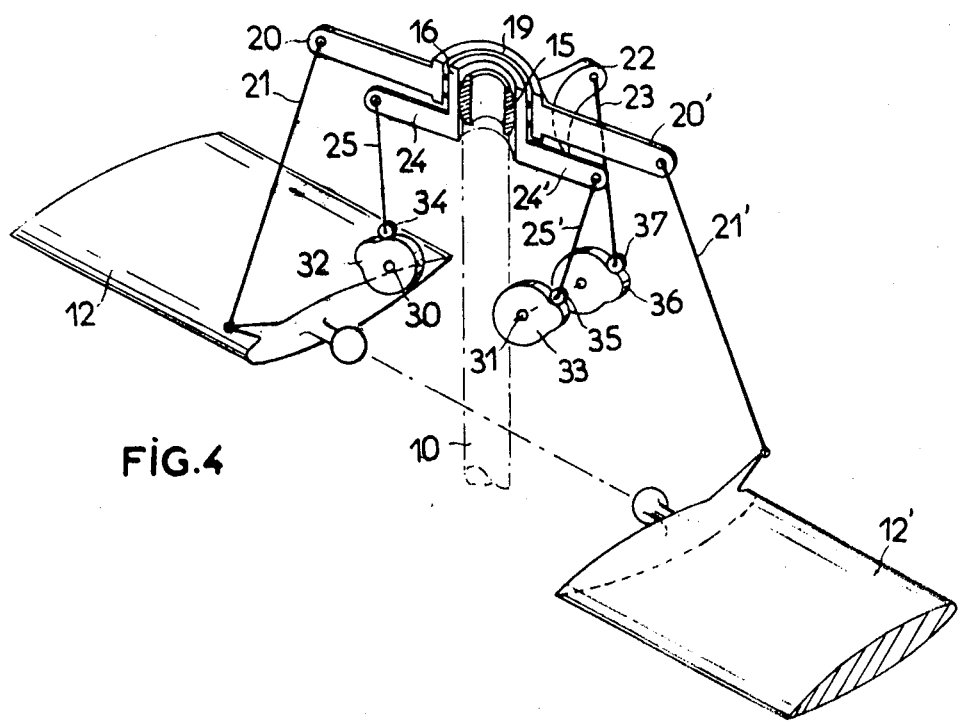

ROTARY WING AIRCRAFT

The present invention is applicable to all rotary wing aircraft such as helicopters or more particularly to purely autorotative aircraft intended for load-dropping from aircraft. The purpose of the invention is to ensure that the dropped load (or the descending helicopter) proceeds along a smooth glide path having a slope on the order of 15° to 20°.

An object of the invention is to improve the stability of rotary wing aircraft, by suppressing the effect of the oscillations of the load (e.g., cabin or container) on the rotor which constitutes by itself a statically and dynamically stable system, and to ensure especially the stability in autorotative descent.

The invention has as a further object, means for automatically controlling pullout and landing, by initiating vertical retardation at a predetermined altitude, to the effect of reducing the vertical velocity from, say, 20 m./s. to 0 m./s. in a very short lapse of time.

By the present invention, stability in descent of rotary wing aircraft is maintained by virtue of the fact that the load (e.g., the container or cabin) is suspended by means of a universal (e.g., ball and socket) joint at the lower end of a nonrotatable shaft on which is rotatably mounted the rotor hub, and that the driving means actuating the control members of the rotor are carried by said shaft, in such a way as to be dependent upon the attitude of the rotor hub without rotating therewith.

The control members for acting on the collective pitch of the blades and on their cyclic pitch, as well as for controlling the plane of the tips rotor of the blades, are released by the response of an altimetric probe at a predetermined altitude and driven by a programmer. The programmer in turn, arranged to be driven by means of a clutch connected with the hub of the rotor.

In the case of a helicopter with the capacity of autorotational descent the control members are separated from the cabin by the ball and socket joint of the latter, and they are constituted by electric or hydraulic jacks operated electrically from the pilot's cockpit, via a telecontrol electric cable passing the universal or ball and socket joint which suspends the cabin.

By way of example, there is described below and illustrated in the annexed drawings an embodiment of the invention applicable to an autorotative rotary wing aircraft, and a schematic illustration of a helicopter application. It will be noted that the construction of the foldable rotor unit with telescopic blades per se is not part of the invention, and will therefore not be described below nor will it be represented in the drawing.

FIG. 4 represents schematically the cam connections of the program control arrangement with the cyclic plate.

Figure 1:
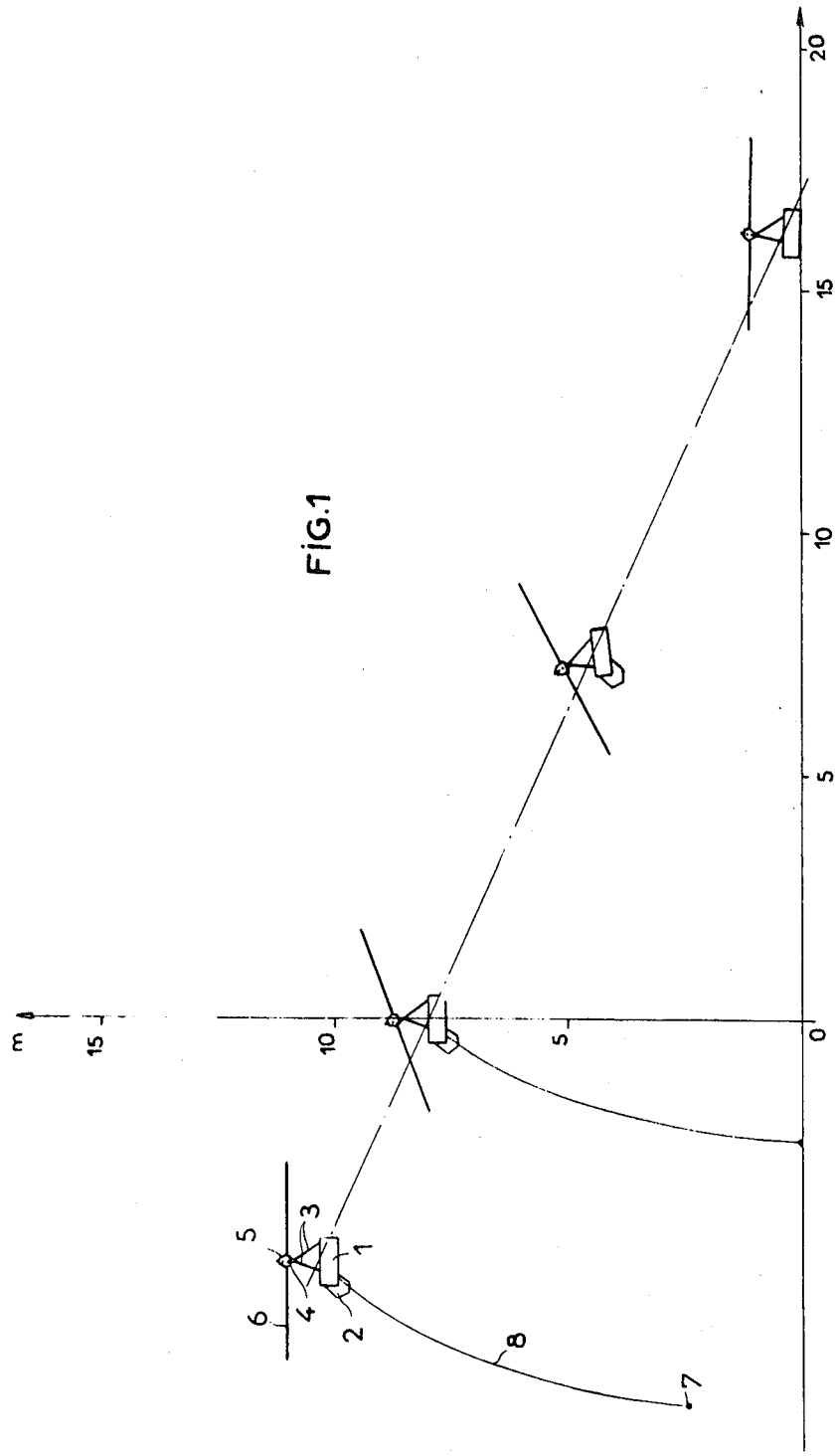
FIG. 1 represents schematically the successive positions of the aircraft during the approach and landing maneuvers.

As represented schematically in FIG. 1, the load 1, provided simply with a fin 2, is suspended by means of the rigid support structure or mast 3 by a universal joint 4 situated under the hub 5 of the rotor 6 in a way which will be described in detail further on.

The maneuvers which must be effected after dropping the machine are the following:

First of all, at the beginning, the rotor blades are set in order to have a negative angle of incidence or pitch in order to accelerate the rotor rapidly. When the rotational speed exceeds a determined value, a centrifugal control arrangement ensures, in accordance with the invention, an increase of pitch in order to load the rotor and adapt the pitch to the speed of rotation.

Towards the end of the descent a probe 7, suspended on a cable 8, releases the programmed control when the aircraft is approximately 8 meters from the ground, this control having the effect of tilting up the leading edge of the rotor disc and of acting on the cyclic pitch in such a way as to reduce the total velocity of descent, the pullout maneuver being initiated by a reduction in the collective pitch allowing acceleration of the rotor by absorbing the kinetic energy of movement. For example, the total duration of pullout (beginning at 8 meters height) to landing can be 3 seconds; the kinetic energy can be reduced in 2 seconds to 6 percent of its initial value, and, theoretically the aircraft can be put on the ground with a forward speed of zero.

Figure 2:
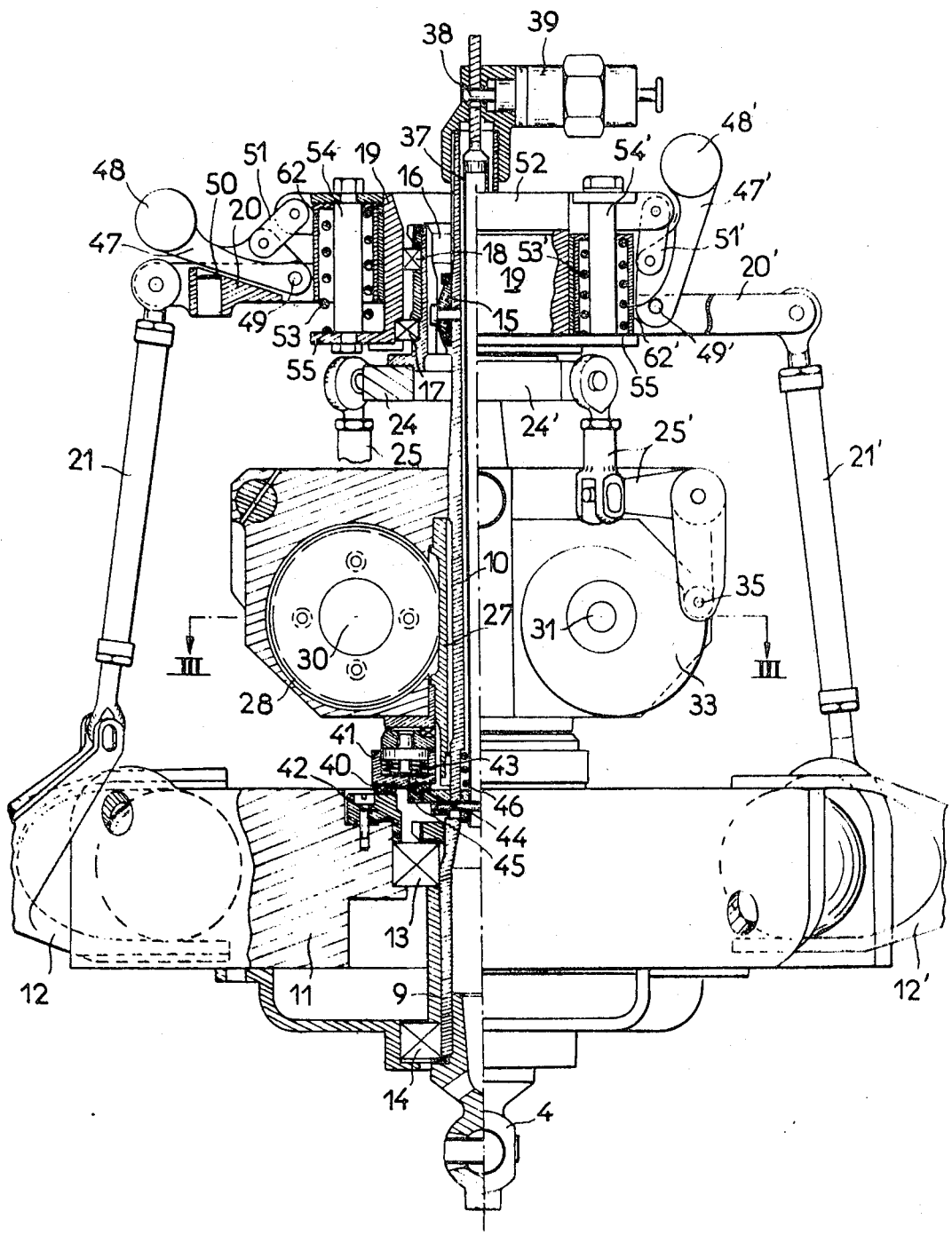
FIG. 2 represents the whole of the control arrangement, part in elevation, part in axial section.
Figure 3:
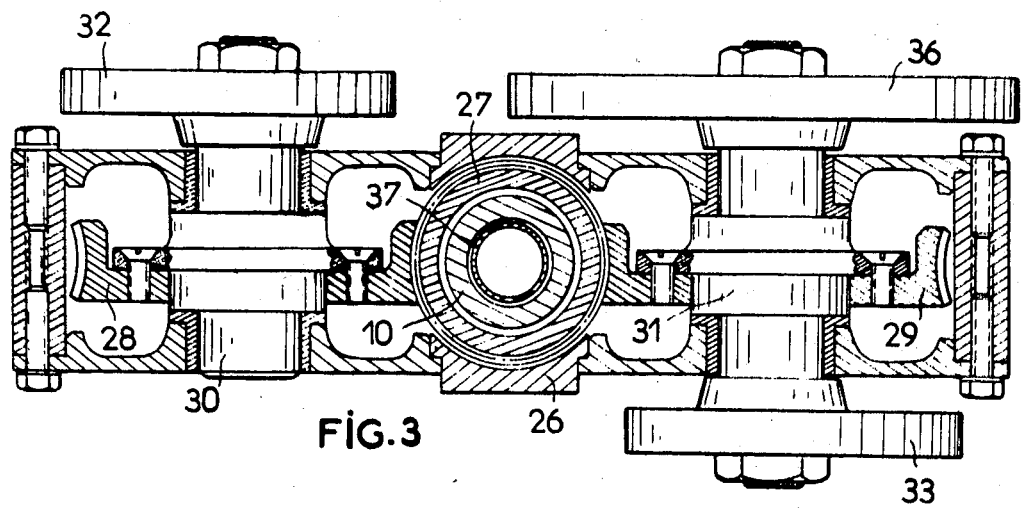
FIG. 3 represents the control arrangement in horizontal section along the line III—III IN FIG. 2.

As represented in FIGS. 2 and 3, the universal joint 4 by which the load is suspended is provided at the lower end 9 of a tubular shaft 10 on which the rotor hub 11 carrying the blades 12, 12' is mounted by means of bearings 13, 14. On its upper part, the tubular shaft 10 carries a spherical joint 15 having a sleeve 16 slidably mounted thereon with universal angular freedom in relation to the shaft 10, but rotationally fixed therewith. The sleeve 16 has a cyclic or swashplate mounted thereon by means of roller bearings 17, 18, the plate 19 carrying two diametrically opposed radial arms 20, 20' (FIGS. 2 and 4) the ends of which are pivotally connected by rods 21, 21' to the blades 12, 12'. It is to be noted that the plate 19 moves with the sleeve 16 axially and angularly, and rotates thereon. Cyclic and collective variations of pitch of the blades 12, 12' are thus controlled respectively by inclination and by vertical (axial) movements of the plate 19 with respect to the shaft 10. The sleeve 16 is further provided with a radially extending arm 22 (FIG. 4) which is driven by a rod 23 actuated by the cam control arrangement, and the angular movement of which causes tilting of the rotor disc. The sleeve 16 carries two diametrically opposed radial arms 24, 24' connected by hinged connecting rods 25, 25' to the cam control arrangement, thereby allowing the whole of the cyclic plate 19 both to rock and to be movable vertically in the axial direction in respect of the shaft 10.

On middle part of the shaft 10 is fixed a frame 26 (FIGS. 2 and 3) in which is mounted, rotatably around the shaft 10, an externally threaded or worm element 27 engaging with two helicoidal toothed wheels 28, 29, respectively, mounted on shafts 30, 31, which are journaled in the frame 26. The shaft 30 also carries a cam 32 controlling by a cam follower roller 34 the connecting rod 25 acting on the arm 24 of the socket sleeve 16, while the shaft 31 carries a cam 33 controlling by its cam follower 35 the complementary connecting rod 25' acting on the arm 24' of the sleeve 16. The two cams 32, 33, when they are rotated by rotation of worm element 27 and consequent rotation of wheels 28, 29, have the effect, according to their profile, of controlling the collective pitch and cyclic pitch of the blades 12, 12' according to whether the cam profile causes either the rocking of the cyclic plate 19 (together with sleeve 16) in one sense of angular direction or the other, or its axial displacement as a whole upwards or downwards, or whether it causes both movements at the same time.

The shaft also carries a cam 36 which acts by the cam follower roller 36A on the rod 23, to control, through the arm 22 of the sleeve 16, the transverse tilting of the rotor disc.

The whole of the cams 30, 33 and 36 with their driving members 27, 28, 29 constitute the programmer which, once released by the altimetric probe in the way which will be described below, effects the landing program which has been stated above.

Releasing and starting the control members with the program is obtained by the following methods:

At rest, the shaft 10 is immobilized axially so as to maintain the clutch ring 41 out of engagement from the rotor hub 11, by means of a nonrotating interior tube 37 to which the shaft 10 is locked by the bolt 38 of an explosive cartridge 39 which is fired electrically by the probe 7 as a consequence of the latter touching the ground. The explosion of the cartridge 39 frees the bolt 38 and enables the shaft 10 and the clutch ring 41 to effect a descending movement in relation to the hub 11, which causes the engagement of what is in effect a friction clutch, by putting an annular friction liner 40 of a ring 41, which rotates with the worm element 27, in engagement with a complementary annular friction surface 42 which is fixed with the hub 11. Frictional engagement between the clutch elements 40 and 42 is ensured by clutch springs 43 housed in the ring 41 which, before the downward movement of the shaft 10, were retained compressed by an interior annular part 44 seating on a flange 45 which is fast with the shaft 10 and which is urged relatively downwards by a spring 46 thus separating from the disc 44 and allowing the friction surfaces of the clutch to engage. Because of the engagement thus caused between the friction surfaces 40–42, the worm 27 is coupled to the rotor hub 11 and rotates therewith. Appropriate gear reduction is provided due to the worm 27 and the toothed wheels 28, 29, and therefore as to the rotation of the cams 32, 33 and 36. The cams control (according to the program determined by their respective profiles) the variations of the pitch of the blades 12, 12' and the necessary deflection of the rotor to achieve pullout and landing.

As has been indicated above, the invention likewise provides a centrifugal control of the pitch of the blades as a function of the rotor speed. For this purpose the arms 20, 20' of the cyclic plate 19 are further controlled by levers 47, 47' being pivoted at 49, 49' on the arms 20,20' on which are formed inclined surfaces 50, 50'. The levers 47,47' are also linked by toggle links 51, 51' to a crosspiece or plate 52 which is rotatable with the plate 19 about shaft 10 and is disposed above the cyclic plate 19. In the rest position, the levers 47, 47' are kept locked by the links 51, 51' being in the upper position represented in the right-hand part of FIG. 2, and thus over a "dead center". The arms 20, 20', which can slide in the example of FIG. 2. on the sleeve part of the cyclic plate 19, carry two cylinders 62, 62' which open downwardly and are fixed with the arms. The cylinders house compression springs 53, 53' surrounding bolts 54, 54' which are fixed at their ends respectively to the upper crosspiece 52 and to an annular flange 55 which is rigid with the sleeve of plate 19. Thus when the arrangement is at rest (as illustrated by the right-hand part of FIG. 2) the toggle links 51, 51' keep the arms 20, 20' and the cylinders 63, 63' locked in their lower relative position with the springs 53, 53' compressed.

Initially, at the moment of dropping, the arrangement is such that the blades 12, 12' have a negative angle of incidence ensuring rapid speeding up of the rotor. When the rotation speed exceeds a determined value, the centrifugal flyweights 48, 48' (which tend to be thrown outwardly) transiently overcome the resistance of the springs 53, 53' through the toggle links 51, 51' (which in this movement cross their dead center line) and apply their levers 47, 47' against the inclined surfaces 50, 50' of the arms 20, 20', which are now moved upwards with the cylinders 62, 62', whilst exerting tractive effort on the rods 21, 21' which control a collective increase in the pitch of the blades 12, 12'. Subsequently, the collective pitch of the blades remains constant, its value being defined by the inclined planes 50, 50' which form the stops, so long as the program described below is not initiated, that is to say, so long as the altitude has not reduced below 8 meters or thereabouts.

Figure 5:
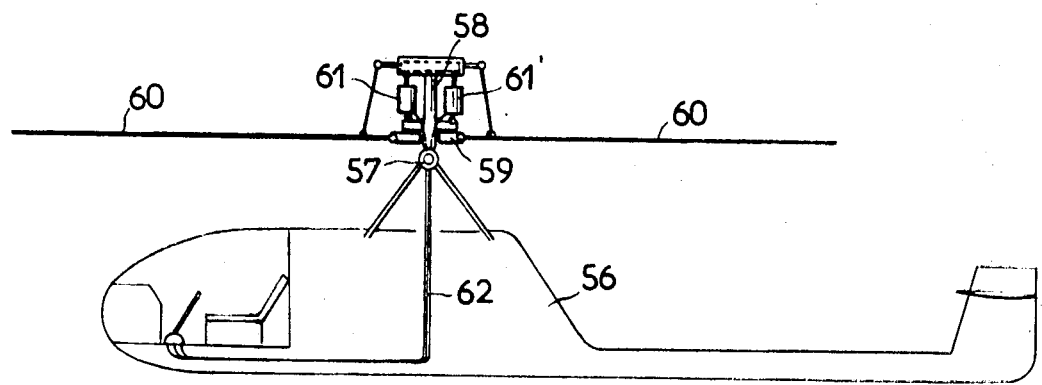
FIG. 5 represent schematically, the application of the invention to a helicopter.

As has been indicated above, the invention likewise applies to helicopters, although in the case of these latter, decoupling between the rotor and the oscillations of the cabin plays a less important role because of the possibility for the pilot to operate the controls constantly. Nevertheless, it can be important in the case of helicopters likewise to stabilize the aircraft and to effect the controls with regard to the hub of the latter and not with regard to the cabin. In this case, as represented in FIG. 5, the cabin 56 is suspended by a universal joint 57, as in the case of the autorotative aircraft described above, at the lower end of the shaft 58 below the hub 59 of the rotor 60. The shaft 58 supports in this case the control members which are no longer constituted by a cam programmer, but by electric or hydraulic jacks 61, 61' which are actuated by means of an electric connection with cables 62 traversing the universal joint 57. A motor driving the hub 59 of the rotor would be carried in such a helicopter, by the nonrotating shaft 58 and provided with means to be disconnected from said hub for autorotation. The number of jacks can be adapted to that of blades of the rotor, and the whole of the control arrangement does not need to have the flattened and elongated form of the frame 26 of FIGS. 1 and 2 wherein this form is imposed by the space requirements of an aircraft with foldable blades for transport by an airplane. It is noted in regard to FIG. 5, that it is so entirely schematic that it does not illustrate a tail rotor or other means for control in yaw, this being an entirely familiar province in the art.

I claim:

1. A rotary wing aircraft provided with a stabilizing device, comprising a central nonrotatable vertical shaft, a rotor hub rotatably mounted on said shaft and having a plurality of rotor blades mounted thereon, a load-carrying body, a universal joint by which the said body is suspended to the lower end of said shaft, rotor control means for collectively and cyclically controlling the pitch of the rotor blades, and for controlling the angular attitude of a plane through the tips of the rotor blades, and driving means operatively connected to actuate said control means said driving means being mounted on said nonrotatable shaft.

2. An autorotative rotary wing aircraft intended for load dropping from aircraft, comprising a central nonrotatable shaft, a rotor hub rotatably mounted on said shaft and having a plurality of rotor blades mounted thereon, a load-carrying body, a universal joint by which the said body is suspended to the lower end of said shaft, rotor control means for collectively and cyclically controlling the pitch of the rotor blades, and for controlling the angular attitude of a plane through the tips of the rotor blades, and driving means operatively connected to actuate said control means, said driving means being mounted on said nonrotatable shaft, wherein the driving means for actuating the rotor control comprises a programming device mounted on said shaft and having a plurality of rotatably mounted cams, a clutch arranged between said programming device and the rotor hub, locking means for normally maintaining said clutch inoperative, altimetric probe means for sensing a predetermined height upon descent of the aircraft, and means for releasing said locking means in response to said height sensing by said altimetric probe to engage said clutch and to rotate the cams of the programming device by the hub of the rotor.

3. A rotary wing aircraft according to claim 2 comprising centrifugally operated means connected to said rotor hub for rotating therewith to lock said rotor blades in a negative incidence blade condition for allowing the rotor to accelerate rotationally until a predetermined rotational speed is reached, and thereafter to unlock said rotor blades for programmed control in a positive incidence blade condition.

4. A rotary wing aircraft according to claim 2 wherein the programming device comprises a horizontally elongated frame carried by said shaft, a tubular worm element coaxially arranged on said shaft for being operatively coupled to said rotor hub by said clutch actuated by the altimeter probe, two horizontal shafts transversely arranged in said frame on opposing sides of the vertical shaft and trunnioned thereon, helical pinions carried by said transverse shafts and engaging said worm element, said cams being carried by said transverse shafts, cam follower means cooperating with said cams, a cyclic plate rotatably and slidably arranged on the upper part of said central shaft, and link means connecting said cam follower means with said cyclic plate.

5. A rotary wing aircraft according to claim 4, wherein the cyclic plate comprises a first sleeve, means slidable, tiltably and nonrotatably mounting said sleeve on said central shaft, and two opposed radially extending arms mounted on said sleeve, wherein said cam follower means for two of said plurality of cams are carried by said two transverse shafts of the programming device respectively and are provided with linking rods pivotally connected to the ends of said radial arms, a second sleeve coaxially arranged on the first sleeve to rotate thereon, two opposed radially extending arms provided on said second sleeve, and a plurality of control rods, each articulated at its one end on the free end of one of the said radial arms of said second sleeve and at its other end to a respective said blade of the rotor, said second sleeve being provided with a third radial arm extending in a direction perpendicular to the direction of its two opposed arms, a third cam arranged on one of the transverse shafts of the programming device, and a control rod carrying said cam follower means of said third cam and pivotally connected on the end of said third radial arm to control the said attitude of said plane through the tips of the rotor blades.

6. A rotary wing aircraft according to claim 4, further comprising journal- and thrust-bearing means mounted in said rotor hub, and wherein the central vertical shaft is formed by a first tube extending through said journal- and thrust-bearing means for limited axial movement therethrough, a second tube is arranged inside the first tube and is axially fixed with respect to said hub, said clutch has two parts, one part of the said clutch being carried by the lower end of the programming device, and the other part of said clutch being carried by the upper face of the rotor hub, a locking member arranged between both said first and second tubes to maintain the outer first tube in a position whereon the two parts of the clutch are spaced from one another, said altimetric probe means includes engaging means for contacting the ground at said predetermined height, and explosive element means for being fired in response to ground contact of the altimetric probe engaging means to release said locking means, wherein the outer tubular shaft slides downwardly through the rotor hub and both parts of the clutch are engaged to drive the worm element of the programming device.

7. A rotary wing aircraft according to claim 4, further comprising a sliding member arranged to vertically slide with respect to said cyclic plate, compression springs arranged between said member and said plate, centrifugal masses having toggle release means articulated on said cyclic plate and said slidable member respectively, connecting rods articulated to said sliding member of the cyclic plate and to the rotor blades to control the negative and positive incidence of said blades, said toggle release means being arranged until a determined rotational speed of the rotor is reached to compress said springs so as to bias the said sliding member in a position to control a negative incidence of the blades and to release said springs and to allow said sliding member to move into a position to control a positive incidence of the rotor blades.

8. A rotary wing aircraft according to claim 1 in which said body comprises a pilot's cabin, and further comprising motor means carried by said central nonrotational shaft for driving the rotor hub, and means for disconnecting said motor means from the hub, the rotor-control means comprising jacks carried by said central shaft, means for electrically actuating said jacks from within the cabin, and electrical cables connected between said cabin and said jacks, said cables passing through said universal joint by which the cabin is suspended to the rotor-carrying central shaft.

\* \* \* \* \*